United States Patent [19]
Hirohata et al.

[11] 4,348,094
[45] Sep. 7, 1982

[54] ROTOR OF ELECTROMAGNETICALLY DRIVEN DEVICE FOR EXPOSURE CONTROL

[75] Inventors: Michio Hirohata, Inagi; Hirosi Sugitani, Kawasaki, both of Japan

[73] Assignee: Canon Kabushiki Kaisha, Tokyo, Japan

[21] Appl. No.: 183,858

[22] Filed: Sep. 3, 1980

[30] Foreign Application Priority Data

Sep. 3, 1979 [JP] Japan ................. 54-112643

[51] Int. Cl.³ .............................................. G03B 9/00
[52] U.S. Cl. ...................................... 354/234; 354/271
[58] Field of Search ................. 354/234, 235, 271; 336/200; 335/272, 282; 310/13

[56] References Cited
U.S. PATENT DOCUMENTS 4,024,552  5/1977  Kondo ............................. 354/234

Primary Examiner—Michael L. Gellner
Attorney, Agent, or Firm—Toren, McGeady & Stanger

[57] ABSTRACT

Disclosed is an electromagnetically driven device for a camera so designed that an exposure control blade opening and closing sector ring, serving as rotor on the base plate of which sector ring conductor coil patterns are arranged, is arranged in a magnetic gap, the base plate of the sector ring as rotor is constituted with a thin heat setting resin plate, the conductor coil patterns are formed on both surfaces of the base plate, then the surfaces of the base plate are coated with dry film layers consisting of the ray radiation setting resin, then the coated layers are hardened with the ray radiation and then the polymerization of the base plate resin material is promoted by heat treating the above base plate.

7 Claims, 5 Drawing Figures

ROTOR OF ELECTROMAGNETICALLY DRIVEN DEVICE FOR EXPOSURE CONTROL

BACKGROUND OF THE INVENTION

The present invention relates to the improvement of the rotor of the electromagnetically driven device to be supplied with a current in the stationary magnetic field so as to drive the exposure control mechanism, particularly of the rotor of the electromagnetically driven device for the shutter and/or the diaphragm by delivering a driving current to the conductor pattern coils so as to rotate the sector ring, so designed that a rotor is arranged in the gap of the magnetic field of the stator, whereby on the base plate of the sector ring, for opening and closing the shutter blades and/or the diaphragm blades conductor, pattern coils are flatly formed and the surfaces are further coated with the insulating films.

In the case of the conventional electromagnetically driven device for the shutter of the camera for opening and closing for example, the shutter blades in operative engagement of the sector ring to be rotated with the electromagnetic driving, on the upper and/or the lower surface of the sector ring formed with a thin plate consisting of insulating material, conductor pattern coils are printed, whereby the rotor is rotated in the magnetic field of the stator by delivering the driving current to the conductor pattern coils. Namely, the above-mentioned rotor is arranged in the gap of the magnetic field of the stator consisting of yokes, whereby a plural number of the magnets are arranged along the radial directions around the optical axis of the optical system around which the shutter is to be arranged. In the case of the above-mentioned construction, the power supplied to the conductor pattern coils of the rotor is proportional to the length L of the components along the above-mentioned radial directions, the magnetic flux density of the magnetic field B and the driving current I. Consequently, in order to increase the driving power, it is sufficient to increase the length L, or the current I or the magnetic field B.

However, the construction of the exposure control device for producing a large driving power in a device such as a camera whose space, weight and so on are greatly restricted, in other words, with high efficiency, is still not known.

SUMMARY OF THE INVENTION

An object of the present invention is to provide a rotor which raises the efficiency of the electromagnetically driven device for the exposure control as mentioned above.

Another object of the present invention is to provide a thin and flat rotor which can be rotated smoothly in the gap of the magnetic field of the stator, whereby the gap is formed narrow so as to raise the efficiency of the electromagnetically driven device.

Further another object of the present invention is to provide a thin, flat, light, heat resistive, humidity resistive and rigid rotor which can satisfy the above-mentioned objects and the method for obtaining such a rotor.

Further another object of the present invention is to provide a rotor having a protection film for preventing the oxydation, the breakage, the shortcircuit and so on of the pattern coils printed on the surface, with no influence to the flatness.

In accordance with an embodiment of the present invention, in the case of the electromagnetically driven device for a camera so designed that an exposure control blade opening and closing sector ring, serving as rotor on the base plate of which sector ring, the conductor coil patterns are arranged in the gap of the stationary magnetic field, the base plate of the sector ring as rotor is constituted with a thin heat setting resin plate, the conductor coil patterns are formed on both surfaces of the base plate, then the surfaces of the base plate are coated with dry film layers consisting of the ray radiation setting resin, then the coated layers are hardened with the ray radiation and then or beforehand the polymerization of the base plate resin material is promoted by heat treating the above base plate, the deformation of the dry film layers and that of the base plate due to the respective polymerization are restricted only along the plane, and not along the direction of the thickness.

Consequently, the shape and the dimension of the base plate is never changed so that it is possible to give the shape to the base plate before heating or ray radiation. Namely, it is not necessary to rectify the shape by pressing and so on after the dry film or the base plate has been hardened in such a manner that the crack in the base plate or the breakage of the printed pattern coils can be avoided.

In the case of another embodiment of the present invention, after the printed pattern coils have been formed on the base plate, the base plate is covered with the dry film layers, sandwiched between the glass plates through which a ray with a certain determined wave length, for example, the ultraviolet rays can penetrate and then radiated with the ray with the determined wave length so that a remarkably superior flatness of the surface of the dry film layers can be obtained, which is quite advantageous.

DESCRIPTION OF THE PREFERRED EMBODIMENTS

Below the rotor to be applied for the exposure control in accordance with the present invention will be explained in detail in accordance with the accompanying drawings.

Figure 1:
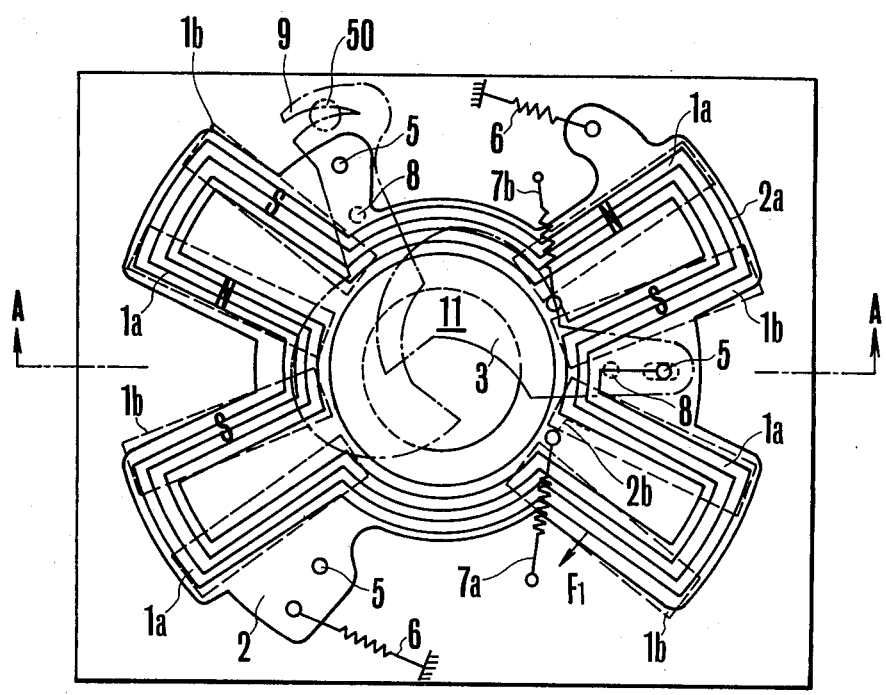
FIG. 1 shows an embodiment of the electromagnetically driven device for exposure control in accordance with the present invention in plane view.

FIG. 1 shows an embodiment of the electromagnetically driven diaphragm shutter as exposure control mechanism having the rotor in accordance with the present invention in elevation.

Figure 2:
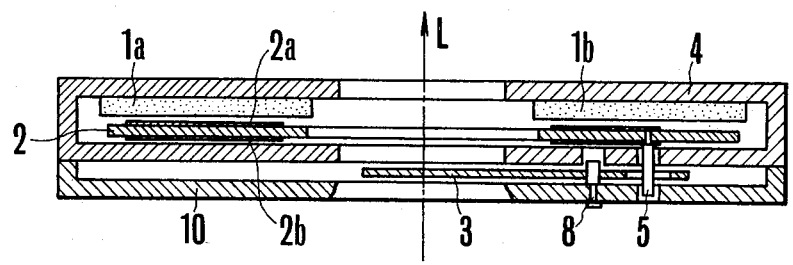
FIG. 2 shows the section of FIG. 1 along A—A.

FIG. 2 shows the section along the line A—A in FIG. 1.

Figure 3:
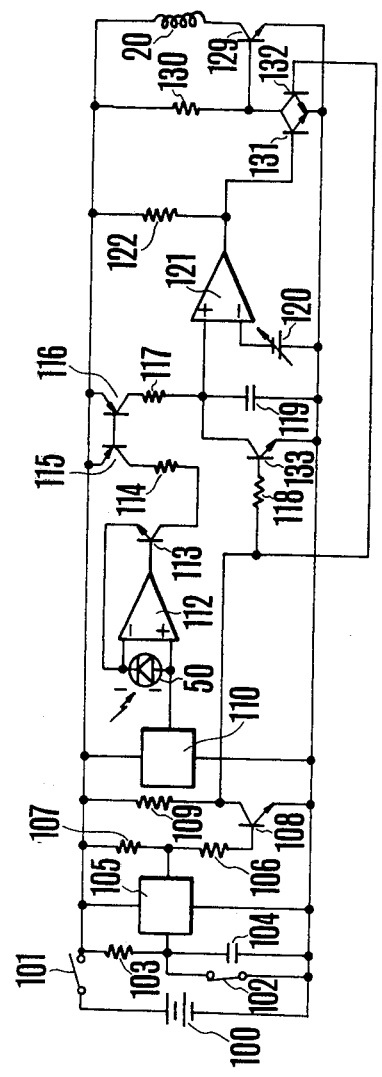
FIG. 3 shows an example of the circuit diagram of the driving circuit of the electromagnetically driven device in accordance with the present invention.

In FIGS. 1 and 2, 3 is a shutter blade serving at the same time as a diaphragm blade, consisting of nonconductive, light shading thermoplastic or heat setting plastic material. In the drawings, only two of a plural number of blades are shown, whereby one of them presents a subsidary diaphragm portion 9. 2 is the sector ring as rotor in accordance with the present invention, consisting of a magnetic glass expoxy resin material. On the upper and the lower surface of the sector ring 2, coil shaped conductor patterns 2a and 2b are printed in such a manner that when the driving current runs through the patterns 2a and 2b the sector ring 2 is rotated by means of a fixed magnet so as to drive the shutter blades 3. Namely, a rotating power is produced in the sector ring in the magnetic field of the fixed magnetic pole by means of the printed patterns 2a and 2b in accordance with Fleming's law. Further, the sector ring 2 is urged by means of the strength of the closing spring 6 along the direction along which the shutter is closed in such a manner that when no current runs through the above coil shaped conductor patterns 2a and 2b the shutter blades are kept in the closed state. Further, each shutter blade rotates around the shaft 8 secured on the base plate 10. The rotating power of the sector ring 2 is transmitted to the shutter blade 3 by means of a projection 5 secured on the ring 2 and consisting of conductive material. A plural number of projections 5 are secured on the sector ring 2 by pressing or soldering, whereby, by means of one of the projections 5, the conductor pattern on the upper surface of the sector ring is electrically connected to that on the lower surface. 9 is the subsidiary diaphragm for controlling the light incident upon the light sensing element 50 for controlling the exposure. 4 is a yoke for constituting a magnetic circuit for the magnet, consisting of soft magnetic material. 1a and 1b are the fixed magnet arranged along the circumferential direction on the sector ring in such a manner that the N pole and the S pole are next to each other, whereby the magnetic flux thereof penetrate through the conductor portions in the patterns 2a and 2b along the radial direction.

The rotor 2 of the electromagnetically driven shutter shown in FIGS. 1 and 2 is arranged in the narrow gap of the magnetic field formed by means of the magnets 1a and 1b of the stator and the yoke 4, so that it is necessary that the rotor 2 should be remarkably thin, highly rigid and, light and flat. In order to obtain the base plate of such sector ring, heat setting plastic material is used in accordance with the present invention. Further, the base plate is coated with ultraviolet rays setting dry film layer in order to avoid the oxydation, the breakage, the shortcircuit and so on of the printed conductor pattern. Further, the material of the base plate of the sector ring must be a heat resistive material because it is necessary to solder the conductor from outside on the lead out portion of the printed conductor patterns 2a and 2b. Although for this purpose, plastic material such as polyimide, polyester, glass fiber reinforced epoxy resin, phenol resin and so on can be taken into consideration, whereby polyimide is superior in hydroscopic action, the polyester is inferior in heat resistance and phenol resin is poor in flatness, which are not advantageous. Consequently, in accordance with the present invention, the base plate of the above rotor is constituted with the glass fiber reinforced epoxy resin.

However, in the case of the glass epoxy resin, the polymerization advances in accordance with the lapse of time in such a manner that the shape is deformed or the flatness is deteriorated so that it is necessary to advance the polymerization by heating. In accordance with the present invention, in order to keep the above deformation connected to the polymerization of the epoxy resin as much as possible along the direction of the thickness of the plate and to avoid as much deformation upon heat treatment as possible, on the surface of the base plate on which the conductor patterns are formed by etching, a UV ray setting dry film layer (for example, Trade Name "Permanent photopolymer coating liston Soldermask" of DuPont Company) is formed so as to protect the conductor patterns, while further in order to make the sector ring as light as possible by minimizing the amount of the coating is trimmed down to the smallest but necessary area by etching. Then, the coated base plate is sandwiched between the two white glass plates, whereby the UV ray is radiated on both sides so as to harden the dry film layers on the surfaces.

At this time, the flat white glass plates serve as guides and the polymerization of the coating advances in accordance with the flatness of the white glass plates, so that it is possible to obtain a superior flatness of the surface after hardening. Further, at this time, the polymerization shrinkage of the dry film coating is free along the direction of the thickness but almost null along the plane, being restricted by means of the epoxy resin on the base plate.

Further, the dry film layer is polymerized, being radiated with the UV ray at the same time on both surfaces in the state sandwiched between the two white glass plates so that the warp of the base plate of the sector ring due to the difference of the polymerization can be avoided.

The thus treated base plate of the sector ring is then heat-treated in an oven at 150° C.–250° C., so as to promote the polymerization of the base plate. At this time, the dry film polymerized mainly with the radiation of the UV ray on the surfaces restricts the polymerization of the base plate so that the deformation of the epoxy resin is only the shrinkage along the direction of the thickness and almost null along the surfaces.

As explained above, at the time of forming the base plate of the rotor in accordance with the present invention, it is possible to limit the shrinkage deformation due to the polymerization only along the direction of the thickness by applying the polymerization of the different systems on the base plate and the coating in such a manner that a rotor precise in dimension along the plate can be obtained. Consequently, the deformation such as the decrease of the diameter of the hole in the base plate of the rotor can be avoided.

Further, in order to avoid the deformation due to the polymerization in a certain determined plane by shifting the time of the above two kinds of polymerizations, it is desirable that the coating is homogeneous along the direction of the thickness and the polymerization speed is even.

For this purpose in accordance with the present invention, the coating is made with the dry film layer, while further the coating is trimmed by etching in such a manner that the coating assumes the same shape on the upper and the lower surface of the base plate so that the difference between the deformation on the upper surface and that on the lower surface becomes small, which advantageously serves for maintaining a flatness.

Further, the present invention provides a special effect for the combination of the epoxy resin having a strong rigidity even before the polymerization with the substance to be polymerized with the UV ray. For example, when a thermoplastic material is used as the surface coating, the surface coating layer is deformed along with the deformation of the epoxy resin forming the base plate due to the polymerization and the speeds of the hardening taking place with cooling are different, when the sector ring is deformed.

In accordance with the present invention, the two materials which are polymerized with different factors are fixed to each other and treated with the different factors in sequence in such a manner that the deformation of the two materials along the plane along which the two materials are fixed to each other is restricted, while the polymerization deformation along any other directions than the above is allowed. Hereby, by guiding the deformation along other directions with the glass plates, the flatness is obtained so as to limit the deformation along the undesired directions in order to obtain the flatness by means of the polymerization, so that a rotor with the desired precise shape and the excellent flatness can be obtained.

Although the case of the above-mentioned embodiment, the UV ray setting resin coating is used in order to constitute the rotor in accordance with the present invention, it goes without saying that the material to be polymerized with other photoenergies such as gamma ray, visible light beam and so on other than the UV ray can be used.

Below, the operation of the electromagnetically driven shutter shown in FIGS. 1 and 2 will be explained. Along with the operation of the release button not shown in the drawings, the driving circuit in FIG. 3 to be explained later is actuated in such a manner that a current runs from the first terminal 7a to the second terminal 7b consisting of conductor patterns. Thus, in the coils 2a and 2b, a rotating force F1 as is shown with the arrow in FIG. 1 is produced in accordance with Flemming's law by means of the component of the current running along the radial direction of the conductor patterns in the magnetic field of the fixed magnets 1a and 1b. By means of this rotating force F1, the sector ring 2 is rotated against the strength of the closing spring 6, whereby this rotation is transmitted to the shutter blades 3 by means of the sector pins 5 so as to open the shutter blades 3 gradually. In accordance with the opening amount of the shutter blades the amount of the light incident upon the light sensing element 50 through the subsidary diaphragm 9 increases until it reaches a certain determined value, when the current from the driving circuit to be explained later is interrupted. Thus, the sector ring 2 is rotated along the counterclockwise direction by means of the sector ring strength of the opening spring 6 so as to close the shutter blades.

FIG. 3 shows the circuit diagram of an embodiment of the control circuit of the electromagnetically driven shutter in accordance with the present invention. In the drawing, 100 is the power source battery and 101 is the normally opened main switch to be operated with the first stroke of the release button not shown in the drawing. 102 is the normally closed release switch to be operated with the second stroke of the release button or the focusing signal, if the camera is of the automatic focusing camera. The resistance 103 and the condenser 104 constitute a time constant circuit, while 105 is the timer circuit for preventing the chattering of the release signal as the output of the time constant circuit.

106, 107 and 109 are the resistances for forming the switching circuit together with the transistor 108. This switching circuit is changed over in accordance with the output of the above timer circuit so as to alter the collector potential of the transistor 108. 110 is the constant voltage circuit and 50 is the light sensing element for the light measurement, whereby, in the case of the present embodiment, a silicone photo-cell SPC is used. The SPC is connected to the both input terminals of the operational amplifier 112. Further, to the output terminal of the operational amplifier 112, the base of the logarithmically compressing npn transistor 113 is connected, while the collector of 113 is fedback to the inverting input terminal of the operational amplifier 112. The collector of the transistor 113 is connected to that of the pnp transistor 115 through the resistance 114. The emitter of the transistor 115 is connected to the power source together with that of the pnp transistor 116, while the bases of the transistors 115 and 116 are connected to each other. Further, the collector of the transistor 116 is grounded through the resistance 117 and the condenser 119. 133 is the switching transistor for short-circuiting the both terminals of the condenser 119, whereby the collector side is connected to the non-inverting input terminal of the comparator 121. Further, the base of the transistor 133 is connected to the collector of the above transistor 108 through the resistance 118. To the inverting input terminal of the comparator 121, the variable voltage source 120 for producing the ASA sensitivity signal of the film is connected. 131 and 132 are the switching transistor for controlling the transistor 129 intended to make or break the current supply circuit to the printed pattern coils.

Both of the transistors 131 and 132 are the npn transistors connected in parallel to each other, whereby the base of the transistor 131 is connected to the output of the comparator 121.

Below the operation of the above circuit will be explained in accordance with FIG. 3.

Because the relay switch 102 remains closed when the main switch is closed, the level of the output of the timer switch 105 is low (L), while the transistor 108 remains in the switched-off state. Consequently, the transistor 133 remains in the switched-on state so that the voltage at the non-inverting input terminal of the comparator 121 is almost null and the level of the output of the comparator 121 is L. Further, because the transistor 108 is in the switched-off state, the switching transistor 132 is brought into the switched-on state and therefore, the transistor 129 is in the switched-off state so that no current is delivered to the printed pattern coil 20 in such a manner that the electromagnetic device does not operate. When then along with the shutter release operation, the above release switch 102 is opened, the timer circuit 105 is closed after the lapse of a certain time determined with the resistance 103 and the condenser 104 in such a manner that the output of the circuit 105 is inverted out of the L level to the H level so as to bring the transistor 108 in the switched-on state.

Thus, the transistors 132 and 133 are brought in the switched-off state. Because in this stage, the level of the output of the comparator 121 remains L, the transistor 131 remains in the switched-off state. Consequently, the transistor 129 is brought in the switched-on state so as to deliver a current to the printed pattern coil 20 and the start shutter opening. At the same time, a light is incident upon the aforementioned SPC 50 through the subsidary diaphragm opening in such a manner that a current proportional to the amount of the incident amount runs into the condenser 119. As soon as the terminal voltage of the condenser 119 reaches the voltage set on the voltage source 120 in accordance with the ASA sensitivity of the film, the level of the output of the comparator 121 is inverted from the L level into the H level. Thus, the switching transistor 131 is closed so as to bring the transistor 129 in the switched-off state and interrupt the current supply to the printed pattern coil.

Figure 5:
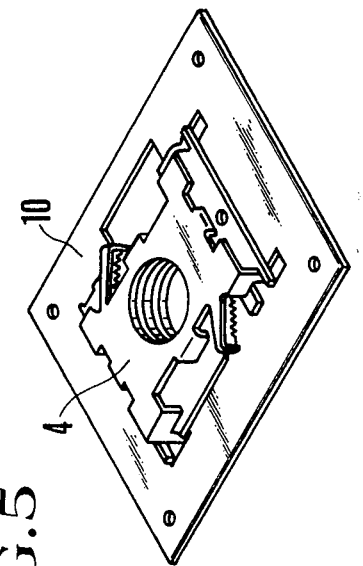
FIG. 5 shows the montaged shutter in FIG. 4 in perspective view.
Figure 4:
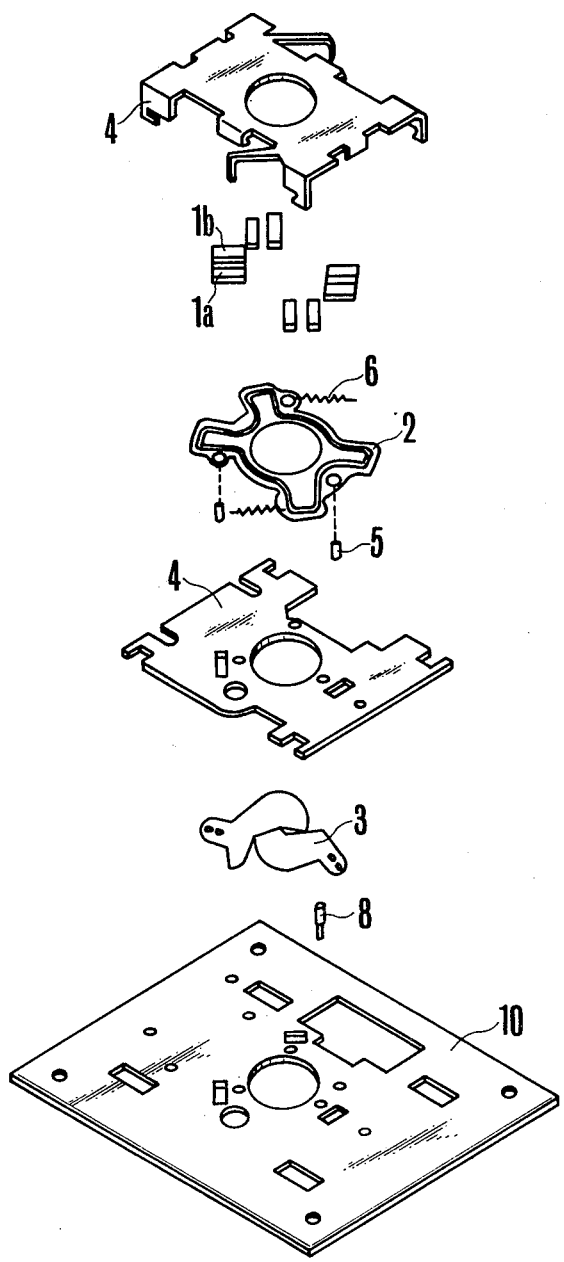
FIG. 4 shows an embodiment of the electromagnetically driven device in accordance with the present invention in pulled apart, perspective view.

FIG. 4 shows the electromagnetically driven shutter in accordance with the present invention in pulled apart perspective view, while FIG. 5 shows the montaged shutter, whereby the members having the same figures are the same members. The explanations have already been made in accordance with FIGS. 1 and 2 so that it is omitted here.

As explained above in detail, the present invention relates to an electromagnetically driven device for opening and closing the exposure adjusting blades by making use of the fact that a rotating strength is produced in the sector ring by means of the magnetic flux from the magnetic poles opposed to the conductor printed patterns provided on the surfaces of the sector ring serving as the rotor for driving the exposure adjusting blades, whereby a high rigidity, a superior flatness and a small weight can be given to the base plate of the sector ring as rotor so that the rotor magnetic gap in which the rotor is to be arranged can be made remarkably small in such a manner that the efficiency of the whole device can be remarkably increased.

What is claimed is:

1. A rotor of an electromagnetically driven device for exposure control comprising:
   a rotor base plate, said base plate being a thin plate consisting of heat setting resin, whereby said base plate is arranged in a narrow magnetic gap so as to be applied with a magnetic field along a direction of a thickness of said rotor, while said base plate is hardened with heat polymerization;
   conductor members, said members being arranged on the upper and/or the lower surface of the base plate so as to be delivered with a current along the radial direction with reference to the center of the rotation of the base plate, while by means of the effect of the magnetic field a driving force along a certain determined direction is produced in said conductor members; and
   protective films, said films covering the surfaces of the conductor members for protecting the conductor members, the protecting films or ray setting material so as to be hardened with a ray radiation before the heat polymerization of the base plate.

2. A rotor of the electromagnetically driven device for the exposure control in accordance with claim 1, wherein when the protective films are hardened, glass plates through which a ray with a certain determined wave length can penetrate are put on the outsides of the protective films for obtaining the flatness of the protective films.

3. A rotor of the electromagnetically driven device for the exposure control in accordance with claim 1, wherein the base plate consists of glass epoxy resin.

4. A rotor of the electromagnetically driven device for the exposure control in accordance with claim 1, wherein the protection films consists of the ultraviolet ray or the near ultraviolet ray setting material.

5. A rotor of an electromagnetically driven device for exposure according to claim 4, in which the conductor members are provided on both sides of the rotor base plate and the protective films are also provided on both sides of the rotor base plate.

6. A rotor of an electromagnetically driven device for exposure comprising:
   a base plate made of epoxy resin,
   a conductor member formed in a coil pattern on both sides of the base plate by means of photo-etching, a protective film of uv or pseudo uv ray setting resin adhered and set in a planar form on both sides of the base plate by means of uv or pseudo uv ray, said base plate being polymerized and set by heating, said protective film being set between glass plates.

7. A method for making a rotor of an electromagnetically driven device for exposure comprising the steps of:
   forming a base plate of epoxy resin;
   forming a conductor member on both sides of the base plate by photo-etching;
   forming a protective film of uv or pseudo uv ray-setting resin on both sides of the base plate by applying uv or pseudo uv to said resin adhered and set in planar form thereon;
   polymerizing and setting said base plate by heating; and
   setting the protective film between glass plates.

* * * * *